(12) United States Patent
Blümich (10) Patent No.: US 7,015,694 B2
(45) Date of Patent: Mar. 21, 2006

(54) NMR APPARATUS AND METHOD FOR STOCHASTIC PULSING OF EARTH FORMATIONS

(75) Inventor: Bernhard Blümich, Rott (DE)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 10/223,399

(22) Filed: Aug. 19, 2002

(65) Prior Publication Data
US 2004/0032258 A1 Feb. 19, 2004

(51) Int. Cl.
*G01V 3/00* (2006.01)
(52) U.S. Cl. .................................. 324/303
(58) Field of Classification Search ............. 324/303, 324/300, 307, 309, 318; 702/8
See application file for complete search history.

(56) References Cited

U.S. PATENT DOCUMENTS

| | | | | |
|---|---|---|---|---|
| 4,326,129 A | * | 4/1982 | Neufeld | 250/262 |
| 4,503,328 A | * | 3/1985 | Neufeld | 250/262 |
| 4,542,343 A | | 9/1985 | Brown | 324/307 |
| 4,634,863 A | * | 1/1987 | Schwartz | 250/262 |
| 4,808,928 A | * | 2/1989 | Frahm et al. | 324/309 |
| 5,291,137 A | | 3/1994 | Freedman | 324/303 |
| 5,585,720 A | * | 12/1996 | Edwards | 324/309 |
| 5,608,321 A | * | 3/1997 | Garroway et al. | 324/307 |
| 6,163,153 A | | 12/2000 | Reiderman et al. | 324/314 |
| 6,166,543 A | * | 12/2000 | Sezginer et al. | 324/303 |
| 6,366,086 B1 | * | 4/2002 | Sen | 324/303 |
| 6,369,567 B1 | * | 4/2002 | Song et al. | 324/303 |
| 6,459,262 B1 | * | 10/2002 | Wisler et al. | 324/303 |
| 6,459,263 B1 | * | 10/2002 | Hawkes et al. | 324/303 |
| 6,466,013 B1 | * | 10/2002 | Hawkes et al. | 324/303 |
| 6,492,809 B1 | * | 12/2002 | Speier et al. | 324/303 |
| 6,518,755 B1 | * | 2/2003 | Edwards | 324/303 |
| 6,559,640 B1 | * | 5/2003 | Taicher | 324/303 |
| 6,563,314 B1 | * | 5/2003 | Kleinberg | 324/303 |
| 6,566,874 B1 | * | 5/2003 | Speier et al. | 324/303 |
| 6,580,272 B1 | * | 6/2003 | Freed et al. | 324/303 |

FOREIGN PATENT DOCUMENTS

GB 2346216 A 2/2000

OTHER PUBLICATIONS

Jurgen Paff et al.; *Nonlinear Incoherent Spectroscopy: NOISY*, Advances in Magnetic and Optical Resonance, vol. 17, No. 1, 1992, pp. 1-46, 22 Figs.

H. Nilgens; *Selective Saturation with Low-Power Pulses*, Journal of Magnetic Resonance, Series A 105, pp. 108-112, 1993, 3 Figs.

B. Blumich; *White Noise Nonlinear System Analysis in Nuclear Magnetic Resonance Spectroscopy*, Progress in Nuclear Magnetic Resonance Spectroscopy, vol. 19, pp. 111-417, 1987, 53 Figs.

B. Blumich; *White Noise Nonlinear System Analysis in Nuclear Magnetic Resonance Spectroscopy*, Progress in Nuclear Magnetic Resonance Spectroscopy, vol. 19, pp. 331-417, 1987, 53 Figs.

* cited by examiner

*Primary Examiner*—Brij Shrivastav
*Assistant Examiner*—Dixomara Vargas
(74) *Attorney, Agent, or Firm*—Madan, Mossman & Sriram, P.C.

(57) ABSTRACT

Stochastic pulsing using random or pseudo-random sequences is used for determination of nuclear spin properties of earth formations. This reduces the power requirements. Processing of the received signals may include linear or nonlinear cross-correlation with the excitation pulse sequence. Inversion of the results of the processing gives the desired nuclear spin property.

28 Claims, 8 Drawing Sheets

NMR APPARATUS AND METHOD FOR STOCHASTIC PULSING OF EARTH FORMATIONS

BACKGROUND OF THE INVENTION

1. Field of the Invention

The invention is related to the field of Nuclear Magnetic Resonance (NMR) methods. In particular, the invention details new methods for creating excitation pulses using stochastic processes in measurement procedures in downhole wellbore logging techniques.

2. Description of the Related Art

NMR is used for well logging and MWD to obtain information on wellbore structure in the form of the NMR signal amplitude, and $T_1$ and/or $T_2$ relaxation times. From these measurements can be determined quantities that are of importance in oil drilling, such as total porosity, bound and unbound fluid, permeability, etc. The traditional method for this downhole NMR is pulsed NMR, using hard (strong) RF pulses, which cause spin-flip angles of the order of 90° and 180°. In a more general sense, this type of NMR is spectroscopy of the strong nonlinear type, meaning that the response of the NMR system is not proportional to the strength of the excitation.

NMR methods are based on the well-understood properties of nuclear spin moments subjected to both a static external magnetic field and an oscillating external magnetic field. It is known that in the absence of a magnetic field, nuclear spin vectors will orient themselves in random directions. In the presence of only a static magnetic field, these individual spins tend to align themselves along the direction of the applied field. This alignment gives rise to an overall magnetization, referred to as the bulk magnetization vector. When the external field is removed, the spins resume their random orientation, and the bulk magnetization vector falls to zero.

Typical NMR methods determine properties of the material by observing how applied RF magnetic fields affect the spin vectors. In current methods, spins are first aligned via the application of a static external magnetic field. In well logging, this magnetic field is typically provided by a permanent magnet. Once the spins have reached saturation, a single RF magnetic pulse is applied perpendicular to the static field which aligns the spins generally in the plane perpendicular to this applied field in a direction generally perpendicular to both the static and RF fields. This pulse is referred to as a 90° pulse. If only the 90° pulse is applied, measurements can be obtained for the rate at which the spins realign along the direction of the static magnetic field. The rate of return along this direction is characterized by a time constant known as the spin-lattice relaxation time, $T_1$.

After the application and removal of a 90° magnetic pulse, the spins, as well as realigning along the direction of the constant field, exhibit a precession around the direction of the static field with a frequency known as the Larmor frequency. The Larmor frequency is given by $\omega_0 = \gamma B_0$, where $\gamma$ is the gyromagnetic ratio and $B_0$ is the strength of the applied constant field.

Typically, the effective static magnetic field is inhomogeneous throughout the formation. As a result according to its local magnetic field, each spin vector tends to precess at slightly different rates. The phase between the vectors, originally nearly zero at the moment the RF magnetic field is removed, diffuses as some vectors spin faster and some spin slower. The diffusion of the phase leads to a reduction of the component of the bulk magnetization in the plane perpendicular to the applied field. This process is known as dephasing. This decay is known as the free induction decay rate and is characterized by its time constant, $T_2^*$. The dephasing can be recovered partly as long as the underlying cause, the local spatial variation of the magnetic field is static. This is done by using one or more refocusing pulse and leads to the formation of one or more spin echos. The decay of these echos is characterized by its time constant $T_2$.

In prior art, in order to observe the values for these time constants, and in particular of $T_2$, the practitioner often applies a sequence of RF magnetic pulses. A sequence of pulses that is used widely in current methods is known as the Carr-Purcell-Meiboom-Gill (CPMG) sequence. In this sequence, the first pulse is a 90° pulse, which aligns the spins generally perpendicular to the applied static magnetic field. Subsequent pulses have twice the duration of the first pulse, and as a result are able to flip each spin vector a full 180° from the direction it had immediately prior to the application of the pulse. A 180° pulse is typically applied during a dephasing stage of the spin echos. After the pulse is removed, the order of the spins is reversed, with the slowly precessing spins spatially in front of the faster precessing spins. The phase between the spin vectors, which was previously diffusing, now is converging back to zero. At convergence, the spin vectors are generally aligned in a common direction again, and the bulk magnetization vector reaches a maximum value, creating a magnetic pulse known as a spin echo. The spin echo induces a voltage in a receiver coil, which is measured through the electronic assembly attached to the coil.

The CPMG sequence can be expressed as $$TW-90-(t-180-t-echo)_n \tag{1}$$

where TW is a wait time, 90 is an excitation pulse having a tipping angle of 90°, and 180 is a 180° refocusing pulse. This gives a sequence of n echo signals. U.S. Pat. No. 6,163,153 to Reiderman et al and co-pending U.S. patent application Ser. No. 09/551,761 of Slade et al, both having the same assignee as the present application, disclose use of a modified CPMG sequence in which the refocusing pulses have tipping angles of less than 180°. This can significantly reduce the power requirements. However, power requirements even for tipping angles of 90° can still be significant. In addition, CPMG sequences or modified CPMG sequences such as those taught by Reiderman and by Slade are relatively inefficient in power utilization in that the duty cycle is small, i.e., large amounts of power are expended in relatively short time intervals and in much of the time (the time between the pulses), no power is used and the apparatus is waiting for the nuclear spin system to respond to the pulses. It would be desirable to have a method of NMR logging that can reduce the power requirements and make more uniform use of power, while still obtaining useful information about formation properties. The present invention satisfies this need.

SUMMARY OF THE INVENTION

The present invention is method of determining a nuclear magnetic resonance spin relaxation property (parameter of interst) of a region of interest of an earth formation. A magnet on a logging tool conveyed in a borehole in the earth formation is used for producing a static magnetic field in the region of interest and aligning nuclear spins within said region of interest. A primary pulse sequence of small flip angle pulses, random or pseudo-random, is defined. A pulse sequence derived from the primary pulse sequence is used to modulate the radio frequency (RF) output of a transmitting antenna and alter the nuclear spins. A receiving antenna is used for receiving signals indicative of said altered nuclear spins. A processor determines from the received signals the parameter of interest.

The logging tool may be conveyed into the earth formation on a wireline or on a drilling tubular. The logging tool may be a gradient logging tool or it may be one in which the static magnetic field has substantially zero gradient in the region of interest.

The parameter of interest may be an apparent transverse relaxation time $T_2^*$, a transverse relaxation time $T_2$, or a longitudinal relaxation time $T_1$. Depending upon the parameter of interest, the primary pulse sequence is one of an equal amplitude random phase sequence, a random amplitude equal phase pulse sequence, a random amplitude random phase pulse sequence, and, a maximum length binary sequence.

In different embodiments of the invention, the applied pulse sequence may be a scaled version of the primary pulse sequence or it may comprise a scaled and time shifted version of the primary pulse sequence. In different embodiments of the invention, linear or non-linear cross-correlation may be performed in determining the parameter of interest.

BRIEF DESCRIPTION OF THE DRAWINGS

The present invention is best understood by reference to the following figures in which like numerals refer to like elements.

DESCRIPTION OF PREFERRED EMBODIMENT

An NMR well logging apparatus which is suitable for use with this invention is described, for example, in U.S. Pat. No. 6,247,542 to Kruspe et al., the contents of which are fully incorporated herein by reference. The device in Kruspe is for exemplary purposes only and the method of the present invention may be used with any NMR well logging apparatus including one conveyed on a wireline. As taught by Kruspe, the NMR sensor assembly is slidably coupled to the longitudinal member wherein the sensor assembly includes at least one sensor for obtaining measurements relating to the parameter of interest. When the sensor assembly is held in a non-rotating position, for instance, for obtaining the measurements, the longitudinal member is free to rotate and continue drilling the borehole. The sensor assembly is slidably coupled to the longitudinal member using, for example, at least one guide sleeve slidably coupled to the longitudinal member. The sensor assembly further includes, for example, at least one transmitter. The sensor assembly of the present invention can include any of a variety of sensors and/or transmitters for determining a plurality of parameters of interest including, for example, nuclear magnetic resonance measurements. The device of Kruspe makes it possible, for example, to obtain NMR measurements with the NMR assembly clamped to the borehole while drilling continues.

Figure 1:
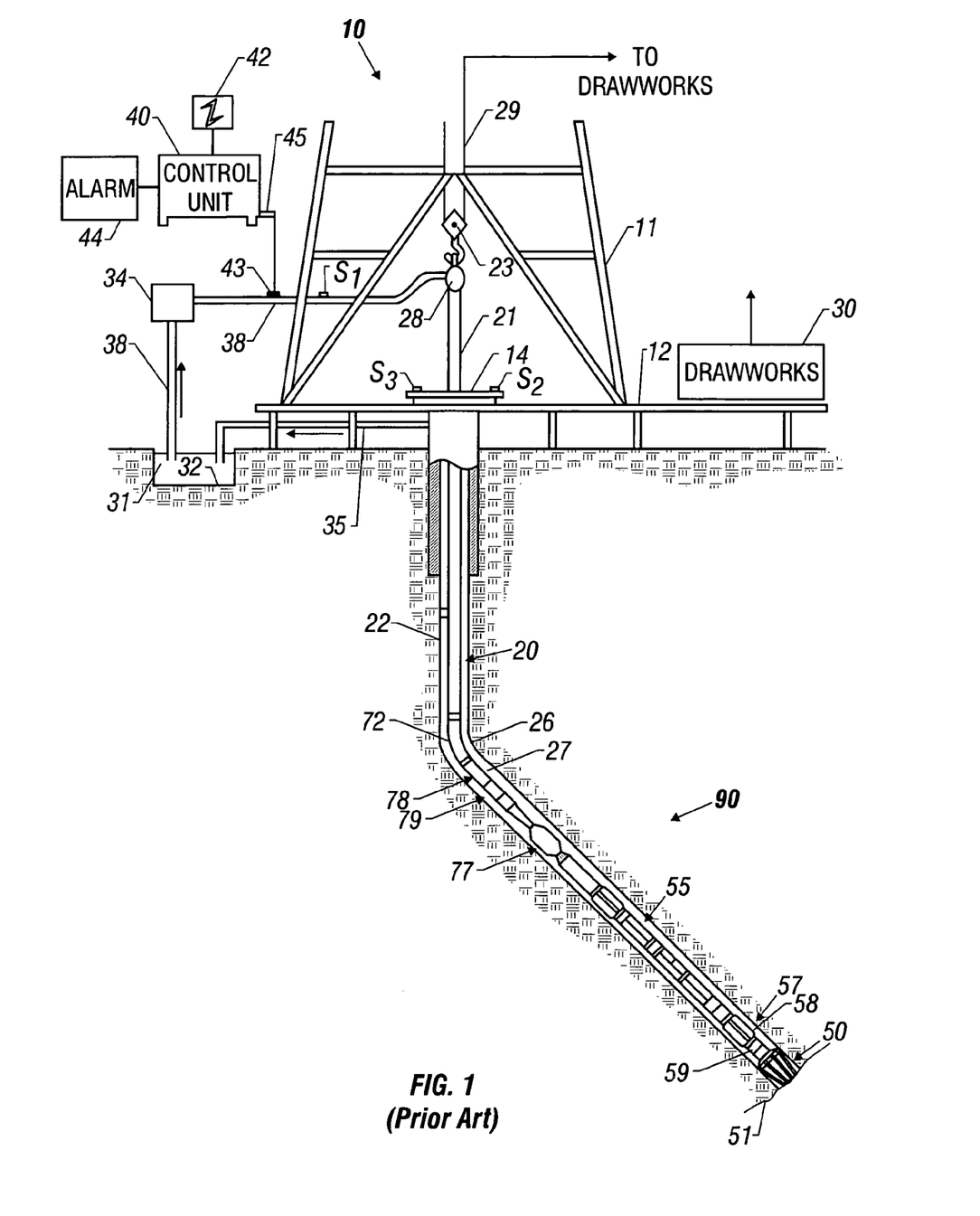
FIG. 1 (PRIOR ART) is a schematic illustration of an exemplary drilling system using the present invention.

FIG. 1 (PRIOR ART) shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communications sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$–$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 2A:
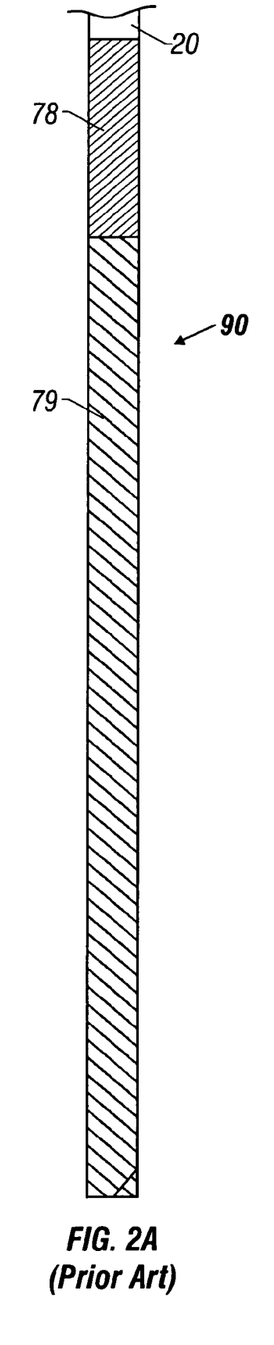
FIGS. 2A–2C (PRIOR ART) are side elevational views partially in cross section (see FIG. 2B) of a drilling assembly including a sensor assembly in accordance with the present invention
Figure 2B:
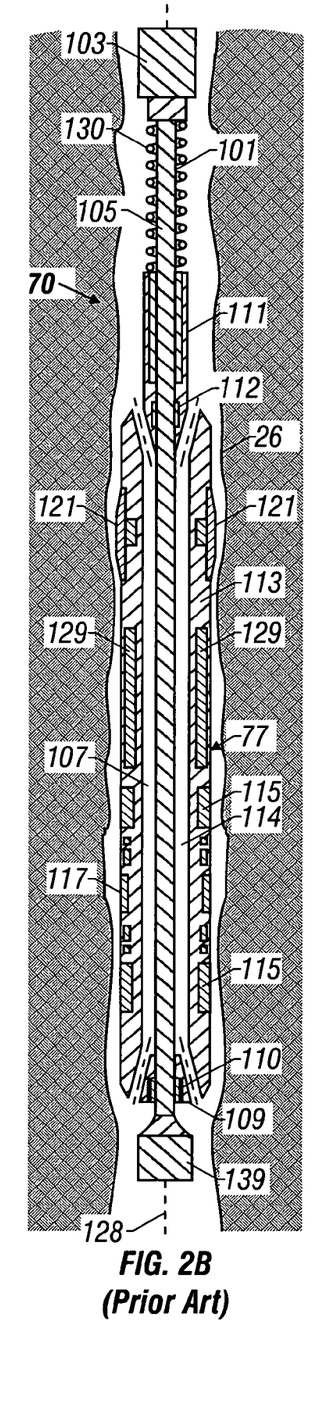
Figure 2C:
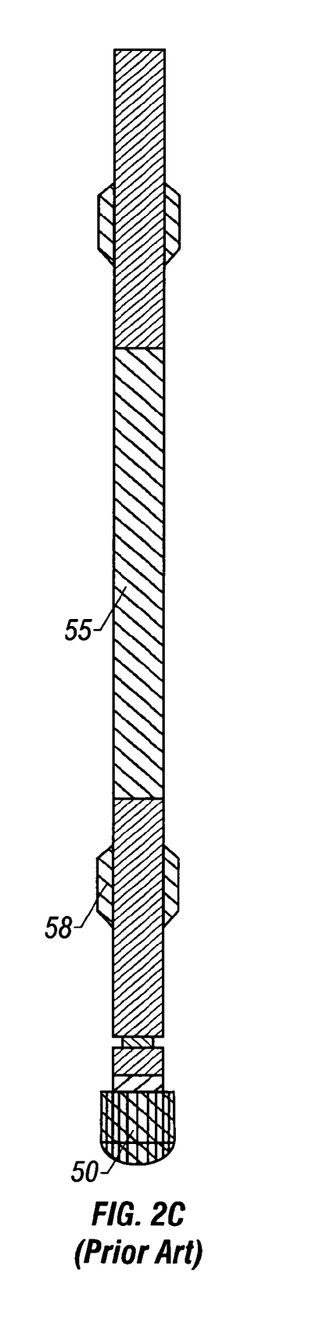

A segment 70 of drill pipe 22, illustrated in greater detail in FIG. 2, illustrates the apparatus and method according to the present invention including a sleeve member, such as a sensor assembly, slidably coupled to a longitudinal member, such as a section of drill pipe, wherein, when the sleeve member is non-rotating, the longitudinal member is free to rotate. The sleeve member may be held in a non-rotating position through engagement with the borehole wall and a decoupling of the sleeve member and the rotating drillstring. The sleeve member including the sensor assembly illustrated in FIG. 2 describes a nuclear magnetic resonance device according to the present invention. However, the apparatus and method according to the present invention can be adapted for any MWD device or tool typically used on a rotating drillstring or for wireline logging.

Referring to FIGS. 2A–2C, the drilling assembly 90 at the end of the drillstring 20 or coiled tubing is illustrated including the segment 70 of drill pipe 22 according to the present invention. The MWD tool 79, including an associated pulsed NMR tool 77 having a sensor assembly 113, and the pulsed power unit 78 are connected in tandem in the drilling assembly 90. The MWD tool 79 may also include a sonic sensor, a density measurement tool, and a porosity measurement tool. As seen in FIG. 2B, the NMR tool 77 is rotationally symmetric about a longitudinal axis 128 of the drilling assembly 90.

The longitudinal member is, for example, a drill pipe section 101, which forms the core of the segment 70. Alternatively, the longitudinal member is a shaft in a downhole directional drilling assembly. The drill pipe section 101 is connected to the drillstring 20 by the upper tool joint 103 and the lower tool joint 139, and has a channel or flow pass 105 for the drilling mud to flow downhole. The sensor assembly 113 surrounds the drill pipe section 101 and is slidably coupled to the longitudinal member or the drill pipe section 101. The sensor assembly 113 is coupled to the drill pipe section 101 by at least one of guide sleeves 109 and 111. The guide sleeves 109 and 111 include, for instance, slip rings and bearings 110 and 112, respectively. Alternatively, a single guide sleeve (not shown) including slip rings and bearings, is used, for example, centrally located between ends of the sensor assembly 113. The guide sleeves 109 and 111 allow the sensor assembly 113 to move freely in the axial direction and to a lesser extent laterally with respect to the drill pipe section 101. The sensor assembly 113 has an outer diameter that is somewhat less than the inner diameter of the borehole 26. For illustrative purposes, FIG. 2B shows the space between the sensor assembly 113 and the borehole wall in an exaggerated manner. The NMR sensor assembly includes flow paths 107 and 114 for return flow of the drilling mud from the drilling assembly 90 below wherein the gap between the sensor assembly 113 and the borehole wall are minimized.

The magnet assembly 115, for providing the static magnetic field, and the RF coil assembly 117 are disposed in the sensor assembly 113. The RF coil assembly 117 includes, for instance, at least one transmitter for transmitting a pulsed RF field into the formation. In the configuration as illustrated in FIG. 2B, the RF field is axial and is orthogonal to the static field of the permanent magnet assembly 115 in a region of interest or examination outside the borehole for NMR signal measurements. However, the apparatus of the present invention is not limited to the illustrated sensor assembly 113. Any number of appropriate magnet arrangements and antenna or coil arrangements which provide a static magnetic field and an RF field orthogonal to the static magnetic field direction for creating the region of interest for NMR signal sensitivity can be used according to the present invention. For example, the NMR tool 77 can employ separate transmitter and receiver RF coils, located, for example, on the sensor assembly 113.

Typically, the RF coil assembly 117 is pulsed and creates a high frequency electromagnetic RF field orthogonal to the static magnetic field generated by the magnet assembly 115 and in the region of substantially uniform field strength creating the region or volume of interest for NMR signal sensitivity. The sensor assembly 113 detects the NMR signals resulting therefrom. Rock pores in the earth formations surrounding the wellbore are filled with fluid, typically water or hydrocarbon. The hydrogen nuclei in the fluid are aligned by the region of homogeneous magnetic field, generated by the magnet assembly 115. The hydrogen nuclei are then flipped away from the homogeneous magnetic field by the pulsed RF field produced by RF coil assembly 117. At the termination of the pulsed RF field from RF coil assembly 117, the hydrogen nuclei revolve or precess at high frequency around the homogeneous magnetic field inducing an NMR signal in the RF coil assembly 117 until the hydrogen nuclei relax to the original direction along the homogeneous magnetic field. The induced NMR signals are processed downhole or sent to the surface for processing.

Those versed in the art would recognize that, depending upon the configuration of the permanent magnet assembly 115, the region of examination could have one of a number of configurations. In one embodiment, the region of examination could be substantially toroidal shaped with the axis of the toroid along the longitudinal axis of the tool. In other configurations, the region of examination could be localized on opposite sides of the borehole or even on just one side of the borehole. It will also be clearly apparent to those skilled in the art that the static magnetic field area can also be obtained if the magnet assembly 115 includes dc-energized electromagnets, or superconducting dc electromagnets. All of these are intended to be within the scope of the present invention.

The NMR electronics 129 is housed in the NMR sensor assembly 113. The purpose of the NMR electronics 129 is to control the sensor assembly 113, record, process and transmit the recorded data, to the telemetry module 72. This can be done by means of electrical or acoustic telemetry by known devices and will not be discussed. A spring 130 having a cable conduit through the spring 130 allows power and data transmission via the guide sleeve 111 and slip ring through the cable conduit to and from the MWD tool 79. The MWD tool 79 also transmits data to the sensor assembly 113, for example, through mud pulse telemetry, and provides power from the power unit 78.

The sensor assembly 113 is also provided with at least one clamping pad, clamping piston or ribs 121. The ribs 121 are capable of outward movement for locking the sensor assembly 113 to the borehole wall during measurement by the sensor assembly 113. In one embodiment, the ribs 121 are hydraulically activated. In the inactivated position of the ribs 121, the sensor assembly 113 rests on the lower tool joint 139 and is held up against gravitational pull by the spring 130 that is fixedly attached to the drill pipe section 101. Continued rotation of the drillstring 20 loosely carries the sensor assembly 113 along. In the activated position, the ribs 121 engage the borehole walls and prevent any further movement of the sensor assembly 113. Further rotation of the drillstring 20 does not affect the position of the sensor assembly 113 that remains in a clamped position against the borehole wall. In the clamped position, the sensor assembly 113 is essentially decoupled from rotational and vertical movement of the drillstring 20, enabling measurements, such as NMR measurements from the NMR sensor assembly 113, to be carried out without interference from tool motion and vibration. By special design of the magnet assembly 115, the region of examination is within the formation and no NMR signal is received from the borehole fluid because no NMR resonance condition exists there.

In another embodiment, at least one sensor of the sensor assembly 113 is located in the at least one clamping pad (not shown) to provide a sensor at the borehole wall when the at least one clamping pad is activated and engaged with the borehole wall. In still another embodiment, at least one transmitter (not shown) is located in the at least one clamping pad to provide a transmitter at the borehole wall when the at least one clamping pad is activated and engaged with the borehole wall.

In typical operation with prior art pulse sequences, the NMR measurement takes between 0.01 to 1 second, during which time the drill pipe section 101 advances some distance. Once the NMR measurement has been completed, the ribs 121 are retracted, as a result of which the sensor assembly 113 is no longer coupled to the borehole wall. The sensor assembly 113 then drops down until any further downward motion is stopped by the spring 130. In another embodiment, the ribs 121 are actuated electrically, e.g., by a stepper motor. Other methods, such as those using springs, would be known to those versed in the art.

In a preferred embodiment of the present invention for use in Measurement-while-drilling, the magnet and antenna configuration disclosed in Slade (U.S. Pat. No. 6,215,304, the contents of which are fully incorporated herein by reference) is used. The method of the present invention may also be used in wireline applications: when this is done, a preferred magnet and antenna configuration is disclosed in Beard et al. (U.S. Pat. No. 6,348,792) and in Reiderman et al. (U.S. patent application Ser. No. 09/605,265, now U.S. Pat. No. 6,445,180), the contents of which are fully incorporated herein by reference, may be used. It should be noted that other logging tools could also be used with the method of the present invention.

As an alternative to the pulse sequences the sequences used in prior art (CPMG sequences or modified CPMG sequence) the present invention uses stochastic pulses with relatively small tip angles. This greatly reduces the power requirements. A similar approach has been taken in the field of seismic exploration: early exploration methods relied on high power explosive sources such as dynamite. In seismic exploration, the impulse response of the earth is indicative of changes in acoustic properties of the earth and recent methods have used swept-frequency sources or stochastic pulsing. See, for example, U.S. Pat. No. 4,106,585 to Stafford and U.S. Pat. No. 5,305,285 to Neville. By cross-correlating the received signals with the outgoing signals, the impulse response of the earth is recovered.

The present invention utilizes a sequence of small spin-flip angles of the order of 0° to 5°. The phase of these pulses, the amplitude, or both are varied in a random or pseudo-random fashion. Therefore, the excitation pulse sequence looks stochastic or like noise. For this reason, this kind of excitation in NMR is called stochastic or noise excitation.

In the simplest form of stochastic NMR, the NMR signals are monitored directly during the stochastic excitation. Joined together, these NMR signals would look like noise (see Paff et al.). To recover the impulse response corresponding to the NMR response to a single RF pulse such as the Free Induction Decay (FID) or spin-echo signals, the correlation of the NMR system response with the stochastic excitation must be obtained. The difference with the seismic case is that a linear cross-correlation of the received signal with the excitation sequence does not give the full information due to the complex interaction of nuclear spins with the pulses. As discussed below, there are two types of approaches that can be taken. The first relies on a higher order cross-correlation between the received signals and the excitation pulse sequence. The second approach uses a linear cross-correlation between the received signals and a transformed sequence derived from the excitation pulse sequences. These are discussed below.

The correlation can be done with analog or digital electronics during measurement or may be numerically after the stochastic NMR signal has been sampled with an analog to digital converter. In logging applications, the latter method would normally be used as analog devices that can withstand the harsh downhole conditions are hard to build.

Nonlinear or higher order cross correlation can be used to generate spin echos, equivalent to Hahn echos. These are needed to get information about $T_2$ relaxation, which, as stated above, is a source of information for determination of formation properties, and different types of fluids. $T_1$ relaxation can be measured with a saturation recovery method similar to conventional pulsed NMR. The saturation is effected by any stochastic saturation sequence for example that described in Nilgens et al. Then, after an evolution time, the partly relaxed nuclear magnetization is detected by stochastic NMR as described above. This measurement is repeated for a variety of evolution time intervals to sample the whole $T_1$ saturation recovery curve, which would show the various $T_1$ components of the formation and can be inverted into a $T_1$ spectrum in the usual ways.

The invention is comprised of a method of stochastic excitation of formation molecules in NMR detection. One advantage of the invention is that in comparison to that of conventionally shaped pulses, the pulse train has low peak power. There is also the possibility of creating almost arbitrary frequency profiles as described by Nilgens et al.

Figure 3:
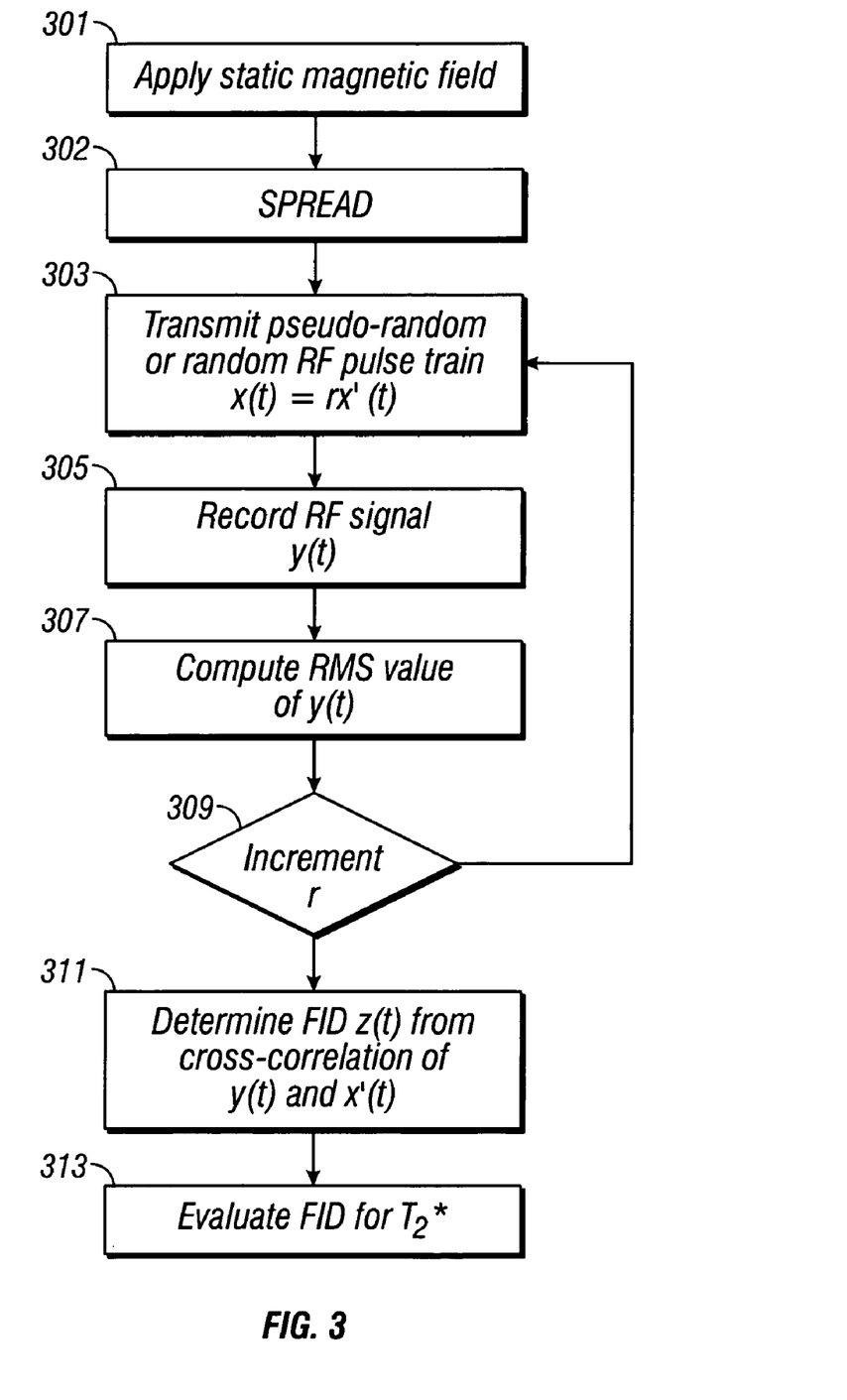
FIG. 3 is a flow chart illustrating a method for determination of $T_2^*$ from a detection of the free induction decay (FID)

Turning now to FIG. 3, a flow chart for a method of determination of $T_2^*$ using the detection of free induction decay is shown. As is typical with most methods of making NMR measurements, a static magnetic field is applied 301. A random pulse sequence x'(t) is defined. This could be a random series of white noise pulses having small tip angles or it could be a so-called maximum length binary sequence (mlbs).

At 302, a process called Saturation Pulses with reduced amplitude distribution ("SPREAD") is used to destroy proton magnetization of such protons that would resonate beyond a certain offset from the selected reference frequency. Nilgens et al describe various methods in which this may be done. There are two reasons SPREAD or an equivalent is necessary.

Firstly, the (short) RF pulses, as used in stochastic NMR, excite a relatively wide bandwidth of frequencies. Consequently the FIDs also possess the same wide bandwidth of frequencies. Additionally, if the excitation uses small spin flip angles and causes a linear response, the FIDs are as short as the pulses and, even worse, occur during the pulses, i.e., they are not detectable. SPREAD ensures that the bandwidth of the FIDs is narrower than the bandwidth of the pulses. This increases the length of the FIDs (increases T2*) and the FIDs can now be seen after the RF pulses.

If the bandwidth of the RF pulses is greater than the resonance bandwidth of the sample (sample of limited volume in relatively small gradient), then SPREAD is not needed, but this situation does not occur in downhole NMR as we have always gradients and a sample of large volume. A gradient is always present in multi-frequency logging tools and even for single frequency tools with the opposed magnet configuration, a small gradient remains in the region of examination.

Secondly, together with the known distribution of the static magnetic field intensity $B_0$, SPREAD can also be used to define a region of NMR sensitivity. This is important to ensure NMR signals are only received from a region far enough from the borehole. This reason for application of SPREAD does not apply to the wireline tools disclosed in Beard et al and in Reiderman et al '265 application.

The applied pulse sequence 303 is given by $$x(t)=rx'(t) \qquad (2)$$

where r is determined as indicated below. The output y(t) of the nuclear spin system is measured 307 and the root-mean-square (RMS) value of y(t) is determined 307. If necessary, the value of r is incremented 309 until an adequate signal level is obtained. The FID z(t) of the system is determined using a linear cross-correlation 311 between y(t) and x'(t). As discussed in Blümich (1987), y(t) is cross-correlated with x'(t−σ) giving the cross-correlation function z(σ) which corresponds to the FID. The FID is then evaluated using prior art methods to give a distribution of $T_2^*$.

Figure 3A:
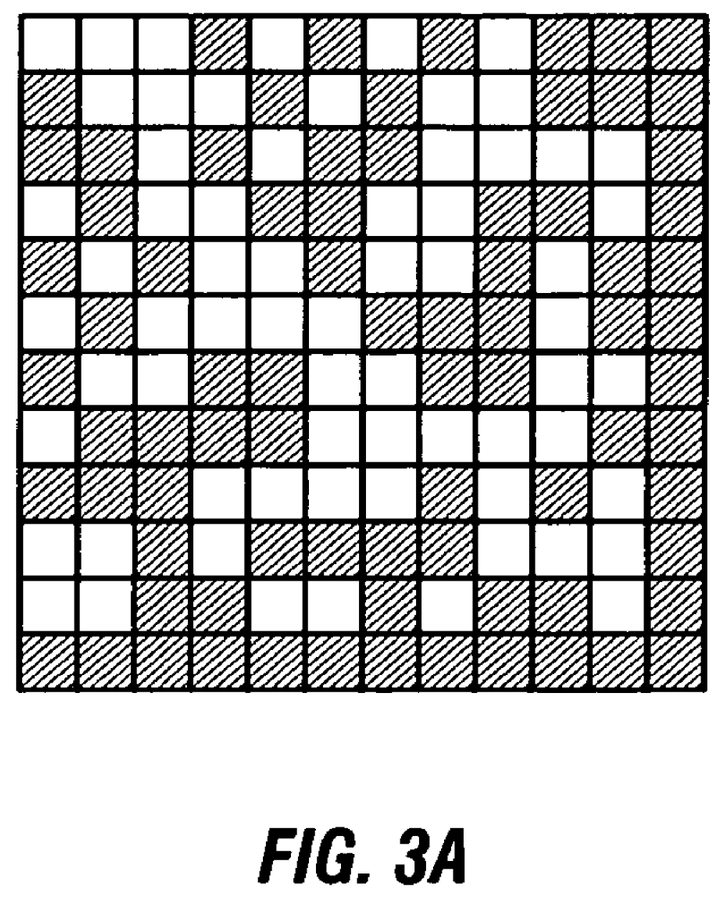
FIG. 3a is an example of a Hadamard matrix

In a preferred embodiment of the invention, the pulse sequence x'(t) is derived from a linear shift register with feedback loops as described by Ziessow and Blümich (1974) so that a maximum length binary sequence (mlbs) results. Cyclic shift of such sequences produces the news of a sequency-ordered Hadamard matrix. A Hadamard matrix is a square matrix containing only 1s and −1s such that when any two columns or rows are placed side by side, half the adjacent cells are the same sign and half the other (excepting from the count an L-shaped "half-frame" bordering the matrix on two sides which is composed entirely of 1s). When viewed as pavements, cells with 1s are colored black and those with −1s are colored white. Therefore, the n×n Hadamard matrix $H_n$ must have n(n−1)/2 white squares (−1s) and n(n+1)/2 black squares (1s). An example of a Hadamard matrix is shown in FIG. 3a. When the pulse sequence x'(t) is derived from a mlbs, then cross-correlation between y(t) and x'(t) may be equivalently derived as a Hadamard transform of y(t).

Figure 4:
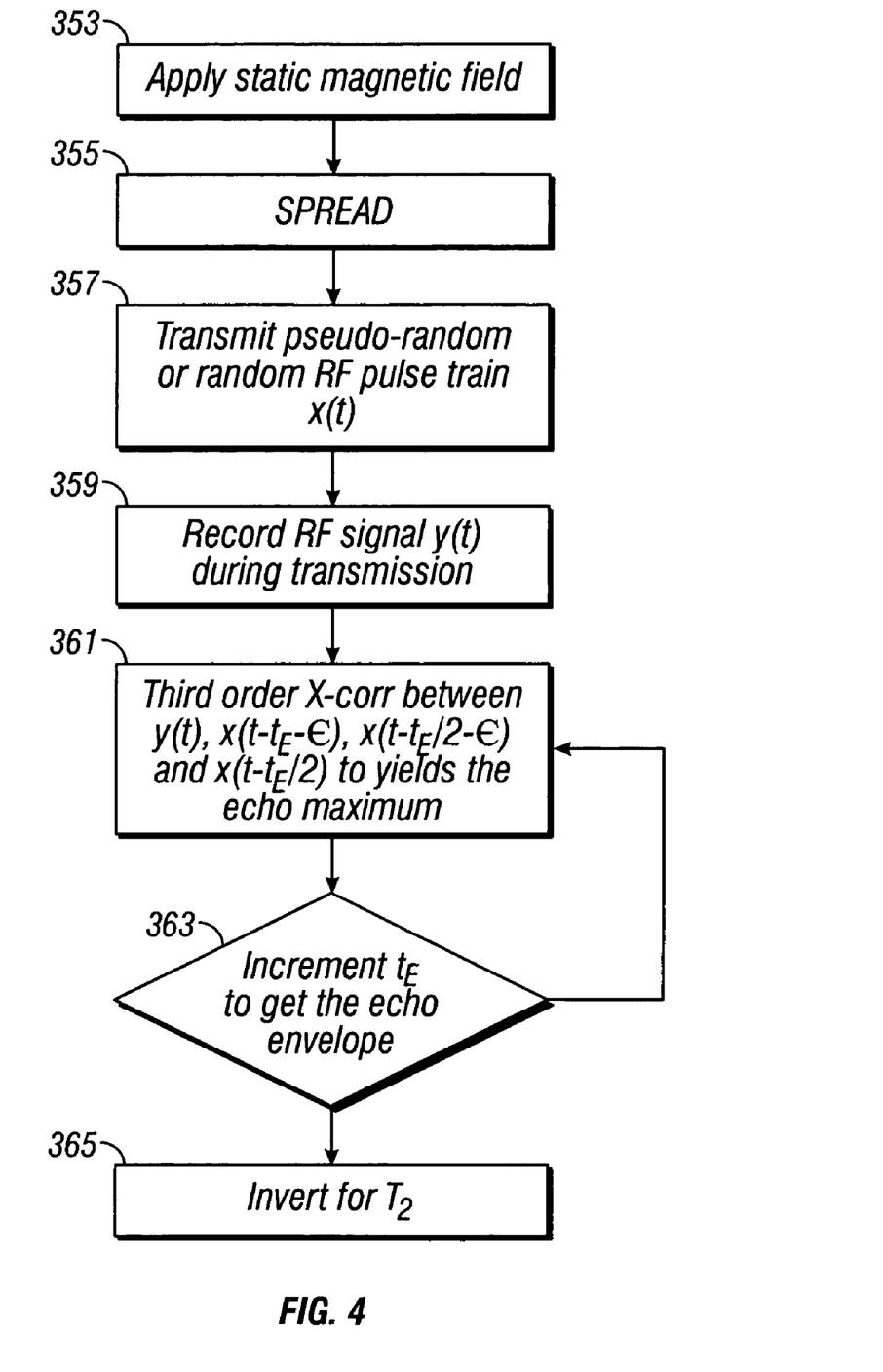
FIG. 4 is a flow chart illustrating a method for determination of $T_2$ using a nonlinear cross-correlation.

Turning now to FIG. 4, a method of determination of $T_2$ using a non-linear cross-correlation is shown. The method starts with application of the static magnetic field 353. Following this, a selective saturation pulse sequence such as SPREAD is applied 355. A pulse train x(t) is then applied 357. This pulse train is a random or pseudo random sequence that may be one of (i) equal amplitude, random phase pulses, (ii) random amplitude, equal phase pulses, (iii) random amplitude, random phase pulses, and, (iv) a mlbs. Following the application of the pulse train x(t), the response y(t) is obtained 359.

A third order cross-correlation between y(t), $x(t-t_E/2-\epsilon-\sigma)$, $x(t-t_E/2-\epsilon)$ and $x(t-t_E/2)$ is determined 361, where $\epsilon$ is a short time lag corresponding to a few, for example three, periods of the excitation pulses. Alternatively the echo itself can be derived by cross-correlation of the transverse magnetization response with $x(t-t_E/2-\epsilon-\sigma)$, $x(t-\epsilon-\sigma)x(t-\sigma)$. This produces a spin echo at time $\sigma=t_E/2$. This simulates a spin echo at a time $\sigma=t_E/2$ for $\epsilon<<T_2$. This is discussed in Paff et al (1992). Next, the value of $t_E$ is incremented 363 to obtain the echo envelope 361. After a sufficient range of $t_E$ values has been covered, an inversion of the echo envelope is carried 365 out to obtain a distribution for $T_2$.

Those versed in the art would recognize that performing the higher order cross-correlation is computationally time consuming. In an alternate embodiment of the invention, only linear cross-correlations are required: this comes at the expense of an increased acquisition time. However, in applications such as determination of clay-bound water where only the early part of an echo train is needed, the time savings can be considerable. This is discussed next with reference to FIG. 5.

Figure 5:
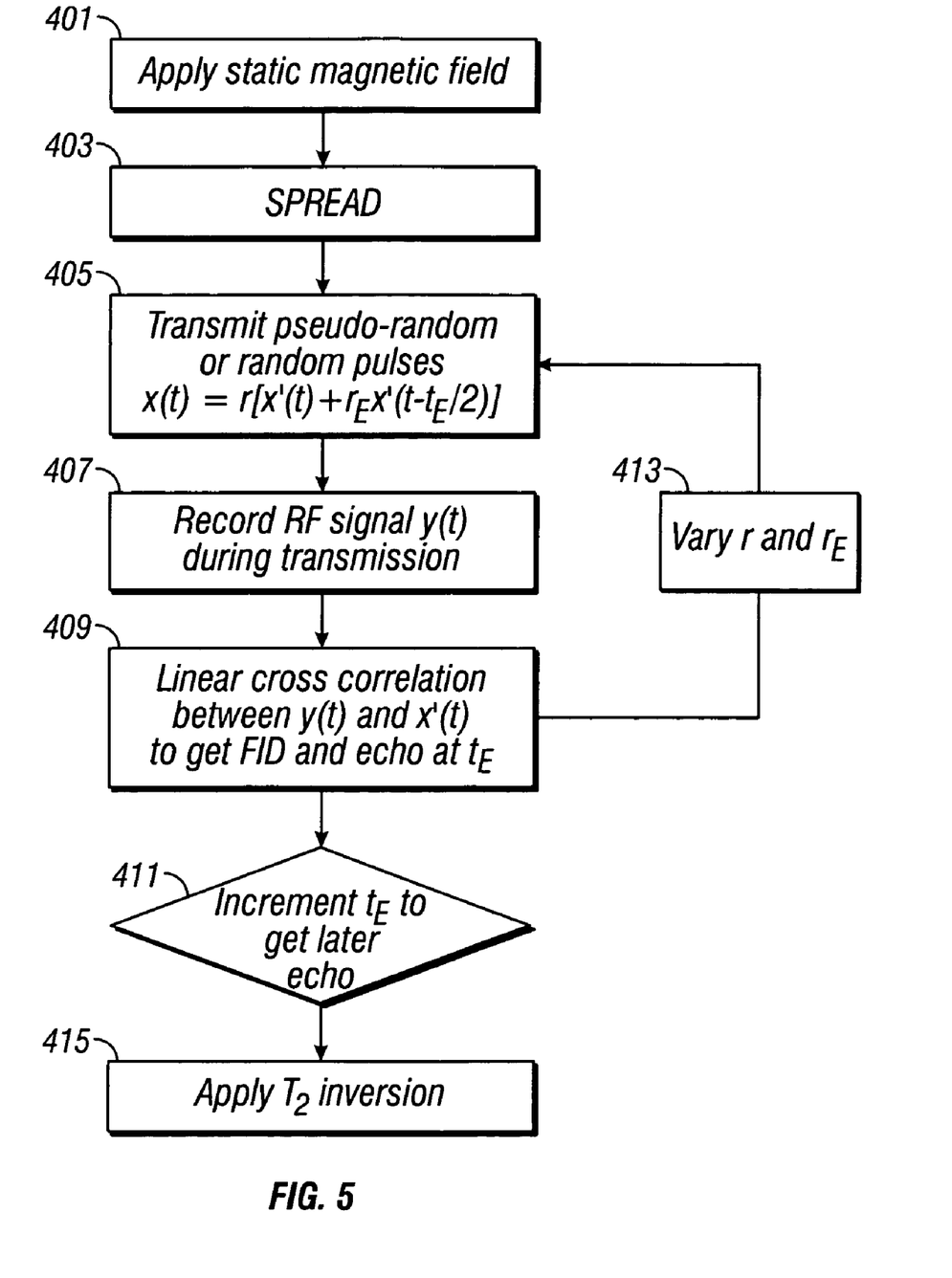
FIG. 5 is a flow chart illustrating a method for determination of $T_2$ using a linear cross-correlation

As in the methods discussed in FIG. 5, the process starts with the application of the static magnetic field 401 and a SPREAD sequence 403. The pulses that are applied x(t) 405 are derived from a sequence x'(t) as $$x(t)=r[x'(t)+r_E x'(t-t_E/2)] \qquad (3)$$

where x'(t) is selected from the group consisting of (i) equal amplitude, random phase pulses, (ii) random amplitude, equal phase pulses, (iii) random amplitude, random phase pulses, and, (iv) mlbs.

The response y(t) is recorded 409 and a linear cross-correlation between y(t) and x'(t) gives a FID sample and an echo at $t_E$ 409. The process is repeated starting at 403 for additional values of r and $r_E$. to optimize the echo amplitudes. The additional values of r and $r_E$ are not necessary if their values can be chosen from experience. Once r and $r_E$ have been determined, the value of $t_E$ is incremented 411 until a sufficient number of echos has been obtained. Once a good sequence of signals is obtained, $T_2$ inversion is carried out 415 using prior art methods.

Figure 6:
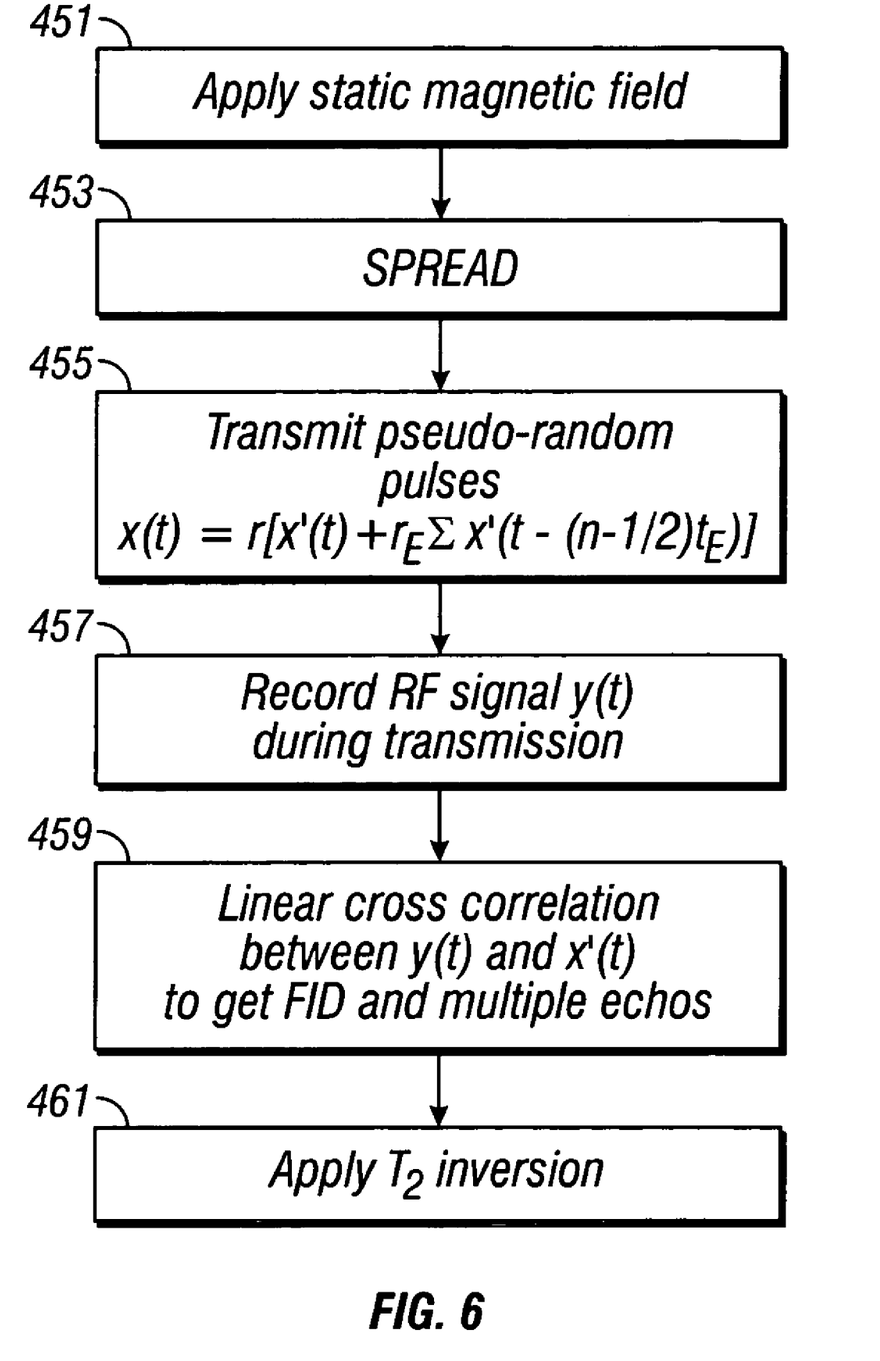
FIG. 6 is a flow chart illustrating a method for determination of $T_2$ using multiple echo generation.

Turning now to FIG. 6, an alternate embodiment of the invention of FIG. 5 is discussed wherein the processing requirements are reduced by having multiple echos generated in one step. As before, the static magnetic field is applied 451 and selective saturation is applied 453. The pulse sequence x(t) that is applied 455 now includes the ability to generate multiple echos. The pulse sequence is given by $$x(t) = r\left[x'(t) + r_E \sum_{n=1}^{n_{max}} x'(t - (n - 1/2)t_E)\right] \quad (4)$$

and uses known values of r and $r_E$. Since the excitation pulse sequence includes a plurality of time shifted versions of the sequence x'(t), multiple echos are generated. As before, x'(t) is selected from the group consisting of (i) equal amplitude, random phase pulses, (ii) random amplitude, equal phase pulses, (iii) random amplitude, random phase pulses, and, (iv) mlbs. A linear cross-correlation between the response y(t) 457 and x'(t) gives the FID and multiple echos 459. These are then inverted 461 to get the $T_2$ distribution.

Figure 7:
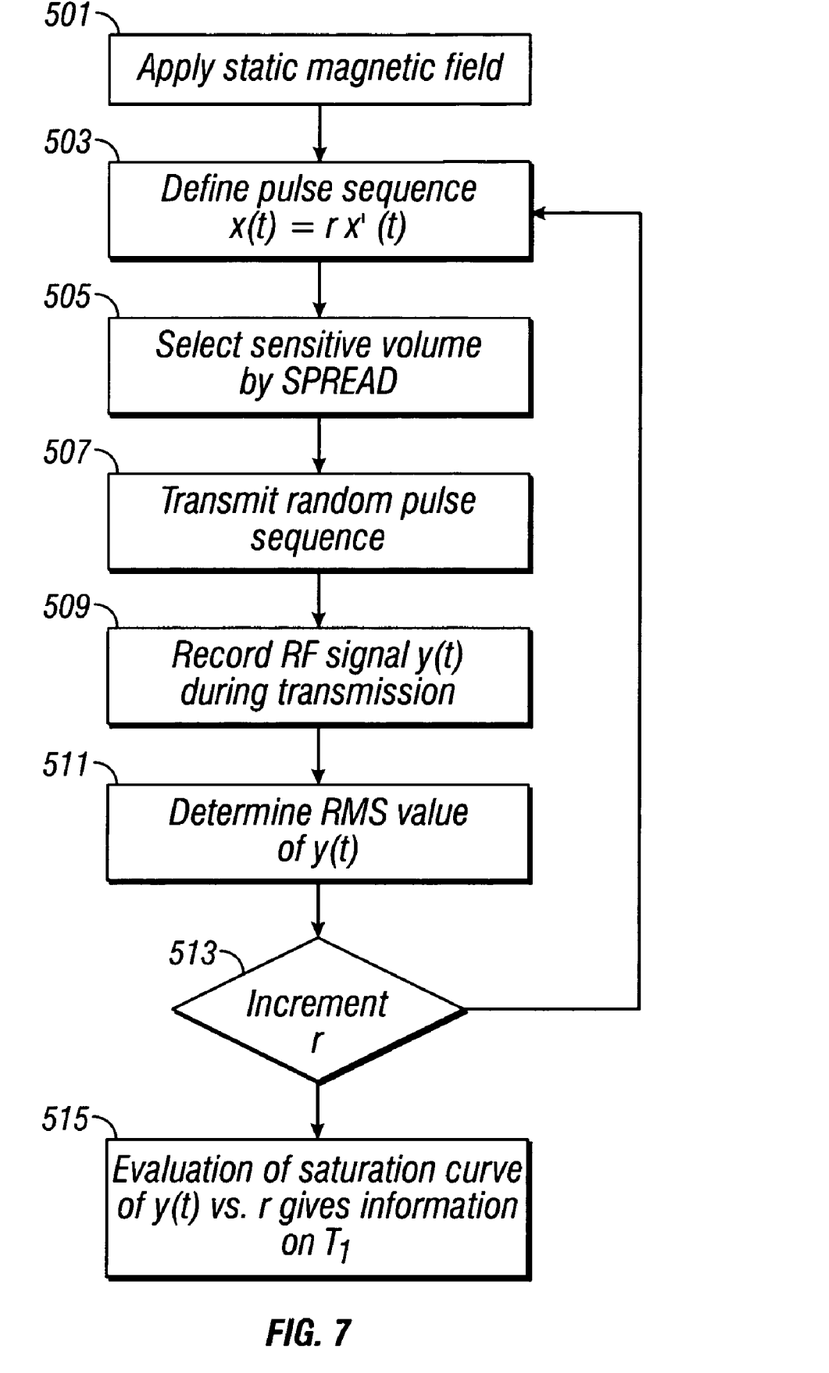
FIG. 7 is a flow chart illustrating a method for determination of $T_1$ using saturation

Turning now to FIG. 7, a method of determining $T_1$ using varying saturation is discussed. A static magnetic field is applied 501 and a pulse sequence x(t)=r x'(t) is defined 503, where x'(t) is selected from the group consisting of (i) equal amplitude, random phase pulses, (ii) random amplitude, equal phase pulses, (iii) random amplitude, random phase pulses, and, (iv) mlbs. A selective saturation is performed using SPREAD 505. The pulse sequence x(t) is applied 507 and the response signal y(t) is obtained 509. The RMS value of y(t) is obtained 511. This gives a single point on the saturation curve. The scale factor r is incremented 513 and additional pulse sequences are defined 505 to obtain addition points on the saturation curve. Evaluation of the curve of the RMS value of y(t) as a function of r gives information on $T_1$. by comparing the experimental curve with simulated saturating curves. This is discussed in Blümich (1987).

The foregoing description has been limited to specific embodiments of this invention. It will be apparent, however, that variations and modifications may be made to the disclosed embodiments, with the attainment of some or all of the advantages of the invention. It is the object of the appended claims to cover all such variations and modifications as come within the true spirit and scope of the invention.

The invention claimed is:

1. A method of determining a parameter of a region of interest of an earth formation comprising:
   (a) using a magnet on a logging tool conveyed in a borehole in said earth formation for producing a static magnetic field in the region of interest and aligning nuclear spins within said region of interest;
   (b) modulating a radio frequency (RF) output of a transmitting antenna with an applied pulse sequence derived from a primary pulse sequence having flip angle pulses less than about 25° and altering said nuclear spins, said primary pulse sequence comprising a random or pseudo-random sequence;
   (c) receiving signals indicative of said altered nuclear spins;
   (d) using a processor for determining from said received signals said parameter of interest.

2. The method of claim 1 further comprising conveying said logging tool in said borehole on one of (i) a wireline, and, (ii) a drilling tubular.

3. The method of claim 1 wherein said static magnetic field has a gradient in said region of interest.

4. The method of claim 1 wherein said gradient is substantially equal to zero.

5. The method of claim 1 wherein said parameter of interest comprises an apparent transverse relaxation time $T_2^*$.

6. The method of claim 5 further comprising applying a SPREAD sequence prior to applying said applied pulse sequence, said SPREAD sequence substantially eliminating longitudinal magnetization outside a selected portion of said region of interest.

7. The method of claim 5 wherein said primary pulse sequence further comprises a maximum length binary sequence, and wherein using said receiving antenna further comprises receiving said signals during transmission of the applied pulse sequence.

8. The method of claim 7 wherein determining said parameter of interest further comprises performing a cross-correlation between said received signals and said primary pulse sequence, giving a free induction decay.

9. The method of claim 7 wherein said applied pulse sequence further comprises a scaled version of the primary sequence.

10. The method of claim 1 wherein said parameter of interest comprises a transverse relaxation time $T_2$.

11. The method of claim 10 further comprising applying a SPREAD sequence prior to applying said applied pulse sequence, said SPREAD sequence substantially eliminating longitudinal magnetization outside a selected portion of said region of interest.

12. The method of claim 11 wherein said primary pulse sequence is one of (i) an equal amplitude random phase sequence, (ii) a random amplitude equal phase pulse sequence, (iii) a random amplitude random phase pulse sequence, and, (iv) a maximum length binary sequence.

13. The method of claim 12 wherein the applied pulse sequence x(t) may be derived from the primary pulse sequence x'(t) by a relation of the form $$x(t) = r[x'(t) + r_E x'(t - t_E/2)]$$

where r and $r_E$ are scale factors.

14. The method of claim 13 further comprising determining a linear cross-correlation between the received signal and the applied pulse sequence.

15. The method of claim 12 wherein using said receiving antenna further comprises receiving said signals during transmission of the applied pulse sequence.

16. The method of claim 15 further comprising determining a third order cross-correlation between the received signal at a time t, the applied pulse signal at a time $t-t_E-\epsilon$, the applied pulse signal at a time $t-t_E/2-\epsilon$, and the applied pulse signal at a time $t-t_E/2$, wherein determining said third order cross-correlation yields the echo envelope as a function of $t_E$.

17. The method of claim 15 further comprising repeating step 14 for at least one additional time and obtaining multiple echos.

18. The method of claim 17 further comprising inverting said multiple echos and obtaining a distribution of values of $T_2$ therefrom.

19. The method of claim 1 wherein said parameter of interest comprises a longitudinal relaxation time $T_1$ and wherein the applied pulse sequence is a scaled version of said primary pulse sequence.

20. The method of claim 19 wherein said primary pulse sequence is one of (i) an equal amplitude random phase sequence, (ii) a random amplitude equal phase pulse sequence, (iii) a random amplitude random phase pulse sequence, and, (iv) a maximum length binary sequence.

21. The method of claim 20 wherein determining said longitudinal relaxation time $T_1$ further comprises evaluating an rms value of said received signals as a function of said scale factor.

22. An apparatus for determining a parameter of a region of interest of an earth formation comprising:
   (a) a logging tool conveyed in a borehole in said earth formation;
   (b) a magnet on said logging tool for producing a static magnetic field in the region of interest and aligning nuclear spins within said region of interest;
   (c) a random-number generator for generating a random or a pseudo-random primary pulse sequence having flip angles less than about 25°;
   (d) a transmitting antenna on said logging tool for producing a radio frequency (RF) magnetic field for altering said nuclear spins, said transmitting antenna being modulated by an applied pulse sequence derived from said primary pulse sequence;
   (e) a receiving antenna on said logging tool for receiving signals indicative of said altered nuclear spins; and
   (f) a processor for determining from said received signals said parameter of interest.

23. The apparatus of claim 22 wherein said logging tool is conveyed into the borehole on one of (i) a wireline, and, (ii) a drilling tubular.

24. The apparatus of claim 22 wherein said processor further uses at least one of (i) the primary pulse sequence, and, (ii) the applied pulse sequence for determining the parameter of interest.

25. The apparatus of claim 22 wherein said parameter of interest is selected from the group consisting of (i) a longitudinal relaxation time $T_1$, (ii) a transverse relaxation time $T_2$, and, (iii) an apparent transverse relaxation time $T_2^*$.

26. The apparatus of claim 22 wherein said transmitting antenna and said receiving antenna are the same.

27. The apparatus of claim 22 wherein said processor is located at one of (i) the logging tool, and, (ii) a surface location.

28. The apparatus of claim 22 wherein said processor further performs one of (i) a linear cross-correlation, and, (ii) a nonlinear cross correlation, for determining said parameter of interest.

* * * * *